United States Patent
Guenther (10) Patent No.: US 7,971,063 B2
(45) Date of Patent: Jun. 28, 2011

(54) METHOD AND DEVICE FOR SAFEGUARDING OF A DOCUMENT WITH INSERTED SIGNATURE IMAGE AND BIOMETRIC DATA IN A COMPUTER SYSTEM

(75) Inventor: Andreas Guenther, Stuttgart (DE)

(73) Assignee: Stepover GmbH, Stuttgart (DE)

( * ) Notice: Subject to any disclaimer, the term of this patent is extended or adjusted under 35 U.S.C. 154(b) by 820 days.

(21) Appl. No.: 11/964,293

(22) Filed: Dec. 26, 2007

(65) Prior Publication Data

US 2010/0106973 A1 Apr. 29, 2010

Related U.S. Application Data (60) Provisional application No. 60/884,908, filed on Jan. 15, 2007.

(51) Int. Cl.
*H04L 9/32* (2006.01)
(52) U.S. Cl. .......... 713/176; 713/168; 713/180; 726/26; 726/30
(58) Field of Classification Search .................... 713/176
See application file for complete search history.

(56) References Cited

U.S. PATENT DOCUMENTS

| | | | |
|---|---|---|---|
| 5,297,202 A | | 3/1994 | Kapp et al. |
| 5,647,017 A | * | 7/1997 | Smithies et al. ............. 382/119 |
| 5,661,805 A | * | 8/1997 | Miyauchi ...................... 713/176 |
| 5,689,567 A | * | 11/1997 | Miyauchi ...................... 713/176 |
| 6,307,955 B1 | * | 10/2001 | Zank et al. .................... 382/121 |
| 7,024,562 B1 | | 4/2006 | Flink et al. |
| 2004/0059924 A1 | | 3/2004 | Soto et al. |
| 2008/0141036 A1 | * | 6/2008 | Vanstone et al. ............. 713/180 |

FOREIGN PATENT DOCUMENTS

| | | |
|---|---|---|
| DE | 10 2006 000 859 | 7/2007 |
| WO | 2006/072047 | 7/2006 |
| WO | 2006/111979 | 10/2006 |

OTHER PUBLICATIONS

Schneider, XP-002155112, "Applied Cryptography," 1996, pp. 38-40.
U.S. Appl. No. 13/040,186, filed Mar. 3, 2011, Guenther.

* cited by examiner

*Primary Examiner* — Ponnoreay Pich
(74) *Attorney, Agent, or Firm* — Fay Kaplun & Marcin, LLP (57) ABSTRACT

A method for safeguarding an electronic document includes inserting at least one digital signature image into the electronic document and generating a first check sum for the electronic document, with or without optionally-inserted biometric signature data, using a first hash function. A second check sum is then generated using a second hash function. The first check sum and the biometric data, if provided, are then symmetrically encrypted using a key that is the sum of the second check sum and a generated random value. The symmetrically-encrypted first check sum is attached to the document. The random value is then asymmetrically encrypted using a first public key of a first key pair and the asymmetrically-encrypted random value is added to the document.

20 Claims, 8 Drawing Sheets

FIG. 8

METHOD AND DEVICE FOR SAFEGUARDING OF A DOCUMENT WITH INSERTED SIGNATURE IMAGE AND BIOMETRIC DATA IN A COMPUTER SYSTEM

CROSS-REFERENCE

This application claims priority to U.S. provisional application No. 60/884,908 filed Jan. 15, 2007.

TECHNICAL FIELD

The present invention concerns, in one representative embodiment, a method for safeguarding a document with at least one inserted signature image and, if applicable, biometric data in a computer system, as well as a correspondingly-operating, computer-based signature system, with which a document can be signed in a biometric-electronic manner so that the document can be provided as secured data with the inserted signature image and can be archived in a manipulation-proof manner.

Moreover, the invention concerns, in another representative embodiment, a method for in-house inspection of a document that has been safeguarded according to the above-noted method and has been encrypted in a special way.

Finally, the present invention concerns, in a further representative embodiment, a method for examining the authenticity of a signed document that had been safeguarded according to one of the preceding methods.

BACKGROUND OF THE INVENTION

Nowadays, it is becoming increasingly necessary to provide a signed document in a revision-proof manner. A so-called biometric-electronic signature has the advantage that a media breach, i.e. printing out an electronic document on paper for signature, is omitted. Moreover, a biometric feature, such as e.g., a signature, can not be copied, stolen or forgotten.

The signature is an unambiguous declaration of intent and a long-recognized method for documenting intention. The usual signature method is not changed with the biometric-electronic signature; however, the signer is not required to be a member of a so-called trust center, as is necessary for a digital signature method. Furthermore, the, e.g., hand-written biometric-electronic signature can be examined by a handwriting expert and for example, can also be compared with signatures on paper; the same applies to a biometric-electronic signature using a fingerprint or voice sample, inter alia, whose features can also be examined by recognized experts according to time-tested methods.

For example, the law covering electronic signatures passed in the Federal Republic of Germany regulates the basic conditions for all paperless signature methods, such as e.g., the digital signature, as used in connection with so-called smart cards and the biometric-electronic signatures relevant herein. This law is based upon the EU-Guidelines for electronic signatures and thereby replaces the law covering digital signatures of 1997, which was limited to only Germany. Thus, a European-wide foundation has been created, based upon which products for electronic signature can be employed in a cross-border manner. It can be assumed that the electronic signature will thereby gain a larger foothold in Europe.

Many large companies now produce their internal workflow almost exclusively electronically. However, up to now, the interface to the "outside world"—e.g., outside contractors such as insurance agents, etc.—has remained paper-bound nearly everywhere. Studies have shown that, for every dollar spent on the production of paper, another 30 to 60 dollars are incurred for the further processing thereof. The biometric-electronic signature thus offers companies the possibility of having electronic documents signed electronically instead of on paper.

In spite of substantial efforts, a biometric-electronic signature of an outside person could not, as of yet, be integrated into an electronic workflow without a media-breach using electronic methods. This shortcoming was due to the legal situation, which was applicable until recently, and also to the previous approaches to solving this problem. The electronic signature captures, which were previously known, now allow every end customer to provide an unmistakable declaration of intent without having to possess a special apparatus or certificate; the declaration of intention is directly transferred into an electronic document as a biometric-electronic signature. This form of biometric signature certainly already possesses a high degree of acceptance today (e.g., in the form of hand-written electronic signatures), in particular due to the well-known package delivery services. However, the misgivings relating to improper use and manipulation of signatures, which are utilized for the execution of contracts, etc., are still very high.

Nevertheless, the biometric-electronic signature is increasingly gaining in importance. From a simple document to a complex agreement, the biometric signature can no longer be ignored for everyday matters. However, the precautions for preventing the manipulation of a biometrically-signed electronic document can still be improved.

It has become known in the interim, with the aid of devices for electronically capturing the signature—so-called signature pads (see e.g., DE 10 2006 000 859.6 and the signature pads of StepOver GmbH/Germany offered under the product names: blueMobile Pad, blueMobile Pad LCD, plusPad and plusPad LCD)—, to realize the handwritten electronic signature without a media-breach during the processing of a digital document from the writing thereof until the archiving thereof. Thus, the central aspect of the problem is the unambiguous correlation of a handwritten electronic signature to a document and to a person. It is also known in the interim to make possible an automatic authenticity-check using the captured biometric data from the handwritten electronic signature and thus to almost completely exclude an improper use. However, it has been shown that security can be still further improved to prevent modification and manipulation of a biometrically-signed (e.g., a handwritten signature) electronic document.

For the sake of clarity, various important terms for the present disclosure are defined as follows:

Electronic signature: reference is made to the corresponding definition in the Guidelines 1999/93/EG of the European Parliament and the European Council concerning the Community Framework for Electronic Signatures, which were published on Jan. 19, 2000 in the Official Journal of the European Community (ABl. L 13 of Jan. 19, 2000, Page 12).

Biometric electronic signature: like an electronic signature, supplemented with an unambiguous biometric identification feature of a person, such as e.g., a fingerprint, a hand-written signature, voice recording, etc., which is securely linked with an electronic data set and/or is inserted therein and is connected by means of a check sum with the data content present at the time point of the signature.

Signature image: a visualization of the signature feature (that is, e.g., the two-dimensional image of a fingerprint, a signature, etc.).

Biometric data: data of a person linked to a feature (such as a fingerprint, a voice recording, a signature, etc.). In contrast to the signature image, biometric data includes, in part, higher resolution and not two-dimensionally depictable information concerning the respective identification feature (e.g., 3-D fingerprint, script image inclusive of writing speed, pressure procession, etc.).

Electric document: a data set, which includes data that can be provided or represented in a form readable or understandable by a human using an appropriate device.

SUMMARY OF THE INVENTION

In a first aspect of the present invention, a method and a device are provided for securely archiving an electronic document, which includes an integrated biometric-electronic signature, and for protecting it against improper use. In addition, according to a further aspect of the present invention, an examination of the authenticity of this document is enabled, such that no possibility for improper use then arises when such documents are sent from, e.g., outside contractors to their employer via an electronic route.

According to another aspect of the present invention, a method is provided for safeguarding a document with at least one integrated signature image in a computer system, wherein the document, which is present in a defined data format, is made available as a data set (step a). In addition, the signature image allocated to this document and optional additional, so-called biometric data of the biometric-electronic signature are made available in one step (step b). Thereafter, the signature image is inserted at the desired location in the document (step c). Then, a first check sum is generated for the document having the inserted signature image and other possible, i.e. optionally-provided, biometric signature data, using a predetermined first hash function (step d). The first check sum can be generated for either the data set as such (File Signature) or the document content, i.e. the "visible/audible" data of the document (Content Signature) and in addition by the biometric data, which may be provided if desired.

Figure 5A:
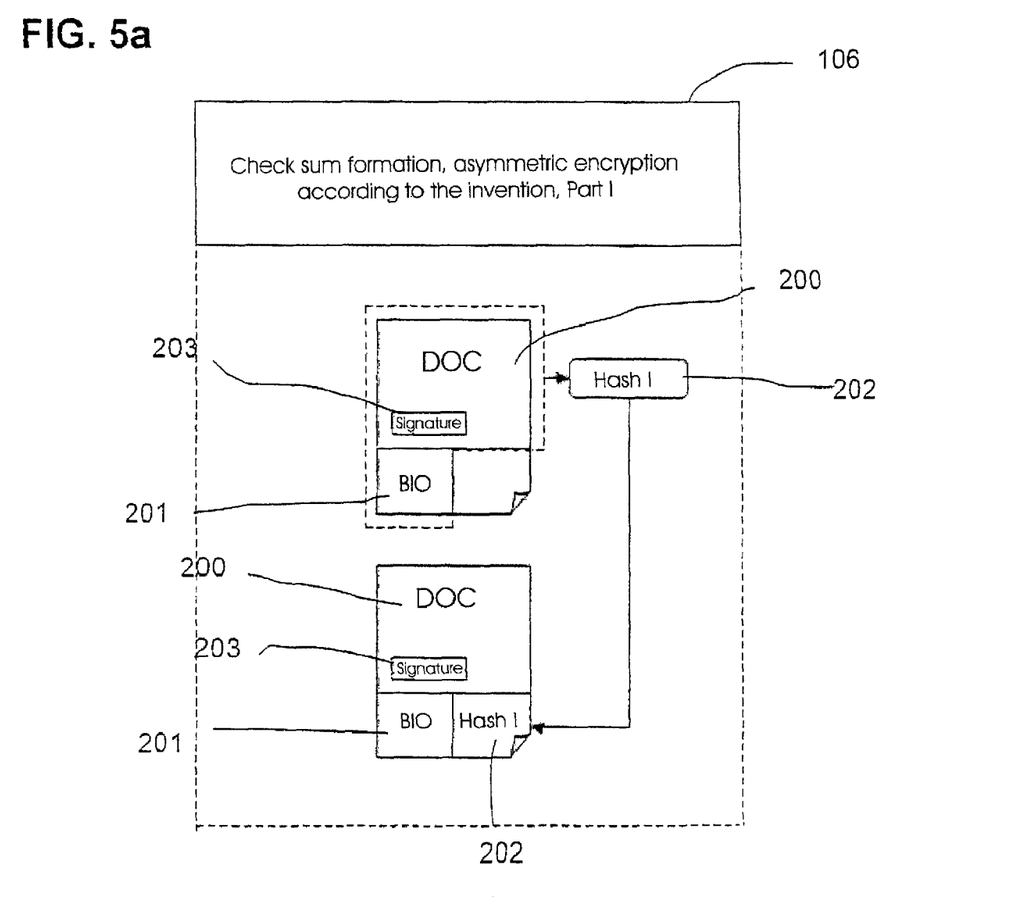
FIG. 5a shows a schematic illustration of a first part of the method illustrated in FIGS. 1-3.
Figure 5B:
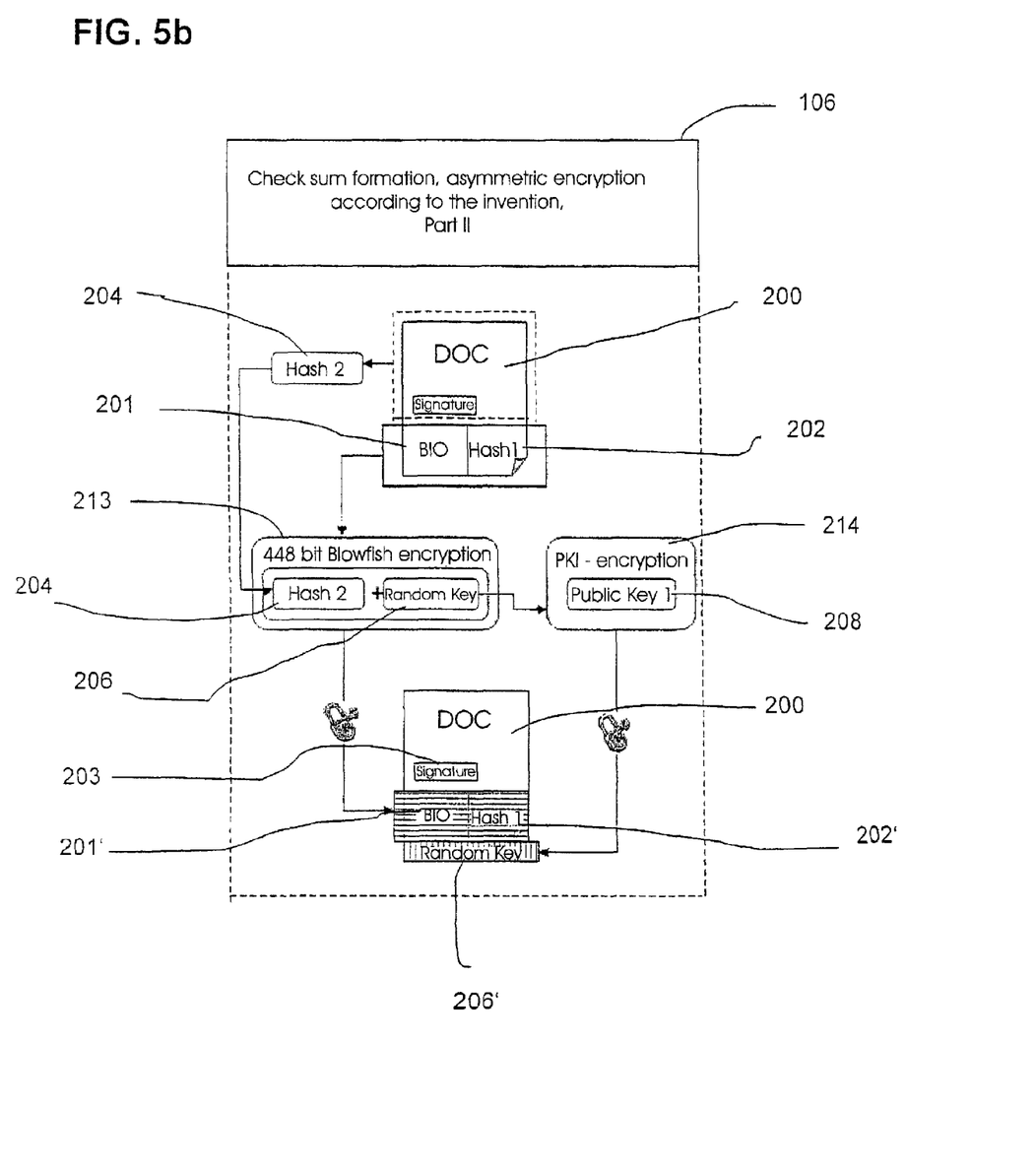
FIG. 5b shows a schematic illustration of a second part of the method shown in FIGS. 1-3.

Thereafter, a second check sum is generated for the document having the inserted signature image using a predetermined second hash function (step e), again either for the data set as such (File Signature) or the document content, i.e. the "visible/audible" data of the document (Content Signature), see also FIG. 5b for more detail. A real random value is generated (step f). A symmetric encryption of the first check sum and the optionally-provided biometric data then takes place (step g). The key for this symmetric encryption is the sum of the second check sum and the generated random value. Then, an asymmetric encryption of the generated random value takes place with a first public key of a first key pair, which is comprised of a first private key and an associated first public key (step h). Finally, the symmetrically-encrypted first check sum and the asymmetrically-encrypted random value are attached to the document (step i).

The last step is performed differently in accordance with the particular type of data set of the electronic document. In a PDF document, for example, the data are stored (see also the PDF specifications) either in a custom-tag, in an object or a signature container (PDF-object for signatures). In case of a TIFF data set, the data are written into the data set either at the end of the data stream or in the alternative, in the TIFF-tag (see the TIFF specifications). For XML-documents, the data are stored in a corresponding XML-tag in the XML-data set. For HTML data sets, this can take place, e.g., behind a commentary tag.

In general, this method can be applied to all data sets, e.g., also audio data sets, provided however that the attached (encrypted) data and check sums are integrated into the data set so that the data set continues to conform to the standard, i.e. e.g., so that a PDF can be brought into or opened up in a corresponding monitoring program for display without errors and a signed audio data set can be reproduced with corresponding standard playback devices.

Such a computer-implemented method for safeguarding an electronic document, into which an associated biometric-electronic signature is inserted, offers for the first time the advantage that the actual operator and user of the method can never change or manipulate the document, in case the utilized private key is consigned to a third party, such as e.g., a notary. Thus, an extraordinarily-secure archiving of this document and the associated signature is possible. Also, such a document can be sent, secure from being accessed, in communications between outside contractors and their employer, e.g., a company. Overall, the document outputted after the performance of the inventive method is more secure against changes by third parties than previous solutions. It can now for the first time be ensured with very high confidence that the document has not been changed after being signed. The checking of the data set integrity may also be used in a judicial evidentiary process and thus it is equivalent to a hand-signed document for the purpose of examining the authenticity of this document.

A further advantage of the proposed method is the fact that it is possible, without further, to integrate a plurality of signatures onto the same document. In this exemplary embodiment of the invention, for the case that a plurality of signatures will be provided, the above-noted steps b-h may be performed as many times as signatures are provided. Thus, the number of hash functions is increased accordingly.

In the following, a further exemplary embodiment of the present invention will be described, which can be utilized when a plurality of signatures will be provided on a single document. A first signature is thus inserted according to the procedure depicted in FIGS. 4-6. When a second signature (and/or an nth signature) is inserted, it then proceeds as follows. Initially, the integrity of the document is tested (for this purpose, if desired, the in-house examination of the above-noted type is performed, for which examination the second public key or, if provided, the second private key is/are required). If this examination turns out positive, then the encrypted Doc-hash can be removed from the document. In the alternative, the encrypted Doc-hash can be stored later with the second encrypted data of the new signature.

Thereafter, it proceeds as follows. A Hash2 is again (for the first time) generated for the document; if the document has not been altered after the first signature, the same Hash2 must thereby result, as it was utilized during the encryption of the first signature. This Hash 2 is now called Hash2Before. Then, the Hash2Before is attached to the document together with the biometric data of the second signature and the signature image is inserted. Then, a new Hash1 is generated for the document content, the contained signature image and the biometric data of the new signature. In so far as this is the same as the procedure for the first signature, it naturally results, however, in another check sum due to the different biometric data and the to-be-inserted second signature image. Moreover, the old Hash2Before, which is stored with the new biometric data and is included therewith, and the encrypted block of the preceding signature are in this Hash1. Then, the block comprising the new biometric data, the new Hash1 and the Hash2Before is symmetrically encrypted; moreover, the asymmetric-encrypted random key of the preceding signature is likewise inserted into the symmetrically-encrypted block. If desired, the asymmetrically-encrypted Doc-hash can also be stored with the symmetrically-encrypted data block for this purpose, in order to be able to draw conclusions, if desired, about the location or the person by means of the key of the second key pair that was utilized to encrypt this Doc-hash. The sum of the new Hash2 and a new random-key is again utilized (as with the first signature) as the key for symmetric encryption.

Figure 6:
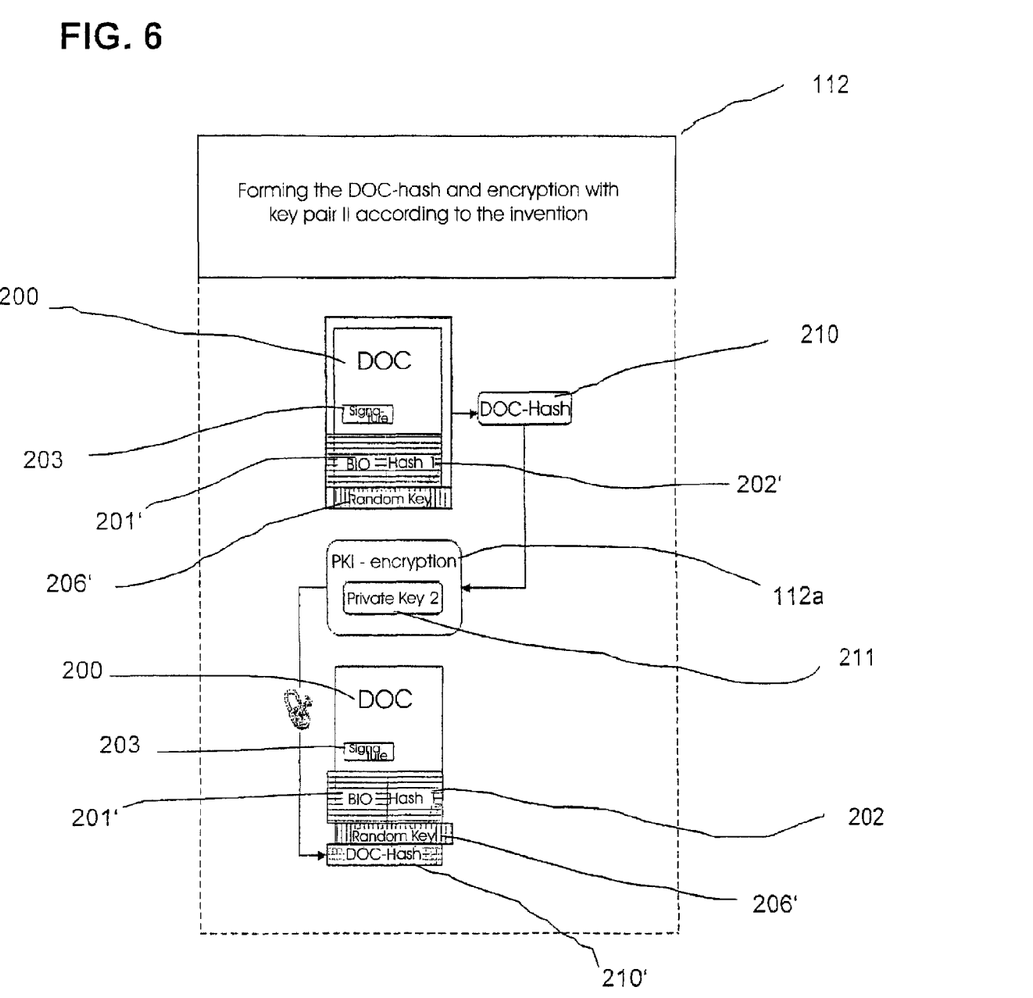
FIG. 6 shows a schematic illustration of a segment of the method illustrated in FIGS. 1-3.

Thereafter, the document contains an encrypted block of the first signature, which contains the biometric-data and the first Hash1. Subsequently, another encrypted block of the second signature follows, which contains the biometric-data of the second signature, the associated Hash1, as well as the Hash2 of the preceding signature (Hash2Before) and the (once again) encrypted random key of the first signature. Thereafter, the asymmetrically-encrypted random key is provided, which is necessary for decoding the second signature. Subsequently, a Doc-hash is again generated as is schematically depicted in FIG. 6, which Doc-hash relates to the content of the document and the encrypted data contained therein (and/or attached thereto). In order to insert another signature, the method can proceed again in the manner described above.

The examination of a document with a plurality of signature images can, for example, take place as follows: the random key and/or the random value of the last signature must be decoded for examination. Then, the examination can be performed using the Hash1 belonging thereto. Subsequently, the random key of the preceding signature can be decoded using the Hash2Before (which can be found in the data block of the already-decoded signature) from the symmetrically-encrypted data block of the preceding signature and subsequently, this (once again asymmetrically-encrypted) random key can be decoded with the corresponding private key. If this signature is not the first in the document, this process continues analogously for the next signature (since the symmetrically-encrypted block of this signature then also contains again a Hash2Before and the asymmetrically-encrypted random key of the preceding encryption).

The private key utilized for the encryption of the random key is, as a rule, always the same (at least as long as all signatures are to be input at the same computer; it can be however also the other way, e.g., when the signature is made with the one software on the one computer and the second signature is made with another software on another computer). If desired, all private keys must then be provided for examination. The great advantage of this method relative to the method described above lies in the fact that one can securely seal the first signature in an asymmetric manner (e.g. in order to forward the document for obtaining a second signature) and nevertheless one can still insert one or more additional signatures.

Consequently, the examination of the document using the Hash1 is still only possible for the last signature, if it succeeds however to decode the respectively preceding signatures using the corresponding Hash2Before check sums, so that it is known with absolute certainty that the document could not have been manipulated between the insertion of this signature and the preceding signature, i.e. a reliable validity check of the preceding signature is thereby provided at the same time.

For the sake of completeness, it is also noted that the individual hash functions can also be identical in an exemplary further embodiment of the present invention. If different hash functions are utilized, then the corresponding hash functions must also be again used accordingly during the examination of the authenticity of the document. Information concerning the utilized check sum functions is consigned in the electronic document for this purpose.

The signature pads, which have become available recently, are known to supply not only the signature image in digital form, but also make available additional biometric signature data. Such biometric signature data can be, e.g., dynamic data such as the pressure procession that is applied by the signer to the signature pad when making the signature, which pressure procession is recorded. The recording takes place in a predetermined resolution in a preset pressure range. The time period, which can be determined from the signer when making the signature, can also be recorded. Thus, the time period is recorded in a predetermined resolution in a preset time range with reference to a preset coordinate system. Further, other/different biometric values, such as fingerprint, handprint, facial features, voice samples and iris or retina samples of the signer can also be ascertained and can also be utilized for identifying the signer.

In a further exemplary embodiment of the present invention, the above-described method for safeguarding a document is extended, in view of the above explanation, to provide biometric signature data in digital form and to integrate it into the respective electronic document. This takes place differently according to the type of electronic document. Reference is made here to the preceding embodiments for the individual data types. A first check sum for the document and the signature image, as well as the biometric signature data, is now generated using the predetermined first hash function. This step replaces the corresponding step d of the above-mentioned basic embodiment of an inventive method. Accordingly, instead of the above step g, the symmetric encryption method is no longer performed with the first check sum, but rather is now performed with the biometric signature data. The key for this symmetric encryption is the sum of the second check sum and the generated random value. Then, the symmetrically-encrypted biometric signature data and the symmetrically-encrypted first check sum are attached to the document. As was previously explained, this step takes place differently according to the type of electronic document data. In order to avoid a repetition of description, reference is made to the preceding embodiment concerning the "attaching" of check sums, etc.

This further exemplary embodiment of the present invention has the advantage that an even more secure identification of the signature and the signer is possible. For this, not only the signature image is assigned to the signer, but also, e.g., the pressure procession and/or the time period for making the signature. As was already indicated, additional and/or other biometric data can also be enlisted for correlating the signature to the signer and can be utilized in the inventive method.

A further improved methodology for safeguarding a document with at least one inserted signature image in a computer system according to a further exemplary embodiment of the present invention comprises the following additional method steps:

k) generating a first overall check sum for the document (i.e. either for the data set as such (File Signature) or the document contents, i.e. the "visible" data of the document (Content Signature)) with the signature image inserted therein and all added attachments using a predetermined third hash function, l) asymmetrically encrypting the overall check sum created in step k with a second private- or public key (depending upon additional identification demands, e.g., at the utilized electronic data processing unit or of the holder of the second key pair, e.g., the outside contractor) of a second key pair, which is comprised of a second private key and an associated second public key, m) adding the asymmetrically-encrypted first overall check sum to the document, and optionally n) outputting the document with the at least one inserted visible signature image and with the invisible attachment(s), such as the optionally-provided biometric signature data, the first check sum, the asymmetrically-encrypted random value and/or the asymmetrically-encrypted first overall check sum.

By generating a first overall check sum and the symmetrical encryption of this overall check sum using a second private- or public key (depending upon additional identification demands, e.g., at the utilized electronic data processing unit or of the holder of the second key pair, e.g., the outside contractor) of a second key pair, a manipulation of the document safeguarded in the above-explained way is even better prevented. For the first time in a method for safeguarding a document with at least one inserted signature image and asymmetric encryption using a second private key of a second key pair, as well as the added asymmetrically-encrypted first overall check sum to the document, an extraordinarily good safeguarding of the document is achieved and thus a document is provided that is extremely well protected against alterations.

As was already mentioned above, the first, second and third hash functions can be different in the previously-described exemplary embodiments of the present invention. In a further exemplary embodiment of the present invention, it is possible to provide these hash functions in an identical manner. The same also applies for the below-described additional method according to the present invention for examining the authenticity of a signed document. For example, the following hash functions can be utilized in the previously-described inventive methods: SHA-256, SHA-384, SHA-516, RIPEMD-128, RIPEMD-160, or Tiger. For example, it is also conceivable that a user can select which of the present hash functions should be utilized in the previously-described inventive methods. For example, such a mode of operation is then useful when all hash functions can not be offered due to legal restrictions in certain countries or new, more-secure hash functions should be utilized. In order to be able to identify the utilized key pair and hash functions in a later examination, corresponding information (ID of the utilized key pair and the name of the utilized check sums/hash functions) are invisibly stored in the document. This storage takes place analogously to the storage of the encrypted check sums and, if provided, the encrypted biometric data inside the data set.

Further, it is also noted that, in the different previously-described embodiments of the inventive methods, for example, the encryption algorithm Blowfish 448 Bit may be used for the symmetric encryption step and RSA 128-1024 Bit may be for the asymmetrical encryption step. Instead of the asymmetric encryption according to RSA, other asymmetric encryption methods, which are well known, may nevertheless also be used; the same applies for the symmetric Blowfish algorithm.

According to a further aspect of the present invention, a method is provided for the in-house inspection of a document, whose check sums and, if provided, biometric data have been encrypted according to one of the previously-described methods. Such a computer-implemented inspection method comprises the generation of a second overall check sum for the entire document with the signature image inserted therein and the respective added attachments using the second hash function. As a result, the step of decoding the first overall check sum added to the document takes place with the second public- or private key (depending upon additional identification demands, e.g., at the utilized electronic data processing unit or of the holder of the second key pair, e.g., the outside contractor and depending upon the thereby-selected private or public key of the second key pair for the encryption) of a second key pair. Finally, the generated second overall check sum and the decoded first overall check sum are compared with each other. If the generated second overall check sum and the decoded first overall check sum are identical, then the present document is identified with high confidence as being the document signed by the signer. If there is a difference between the two values, it is to be assumed that the document was manipulated.

This inventive method enables, as indicated above, an in-house inspection in order to be able to examine whether this document has experienced alterations and, if desired, permits conclusions to be drawn about the person or the device, to which the second key pair can be assigned, concerning the ID of the second key pair utilized during the encryption. This first stage of the examination of the inventive encrypted method, however, does not permit (or at least not with high confidence) examination of the person, who has signed this document and to their biometric data. For this purpose, the method described in the following enables the examination of the authenticity of a signed document according to the present invention.

According to a further aspect of the present invention, a method for examining the authenticity of a signed document, which has been safeguarded according to an above-described method, is provided. Such an examination method comprises generating a third check sum for the document, i.e. the data set as such (File Signature) or the document contents, i.e. the "visible" data of the document (Content Signature) with the signature image inserted therein. Then, the decoding of the random value takes place using the private key of the first key pair (if desired, consigned to a notary). The sum of the third check sum and the random value is then utilized in order to decode the symmetrically-encrypted check sum for the document and the, if provided, added biometric data, as well as the, if provided, biometric data encrypted together with this check sum. If the document has been altered in the meantime, this decoding can no longer take place, because the check sum necessary for the decoding is then different than the one that was used for the encryption. Then, a check sum for the document is generated with the inserted signature image and other possibly-, i.e. optionally-, provided biometric signature data, either for the data set as such (File Signature) or the document content, i.e. the "visible/audible" data of the document (Content Signature), and additionally for the biometric data, which may be provided if desired. If this check sum matches the decoded check sum, it is ascertained with certainty that neither the document nor the biometric data contained therein have been altered after the signature event. Then, the biometric data can be given to an appropriate expert (e.g., handwriting expert) for person identification.

A further aspect of the present invention concerns a signature system for signing a document and for providing a safeguarded data set with inserted signature image. Such a computer-supported signature system comprises a signature apparatus, a data processing device, which is in encrypted-communication with the signature apparatus, and an output interface. The signature apparatus representing a part of the signature system is comprised of at least a signature capturing window, on which a signature is executed using a writing device, and a signature data capture device, with which biometric signature data are also optionally captured in addition to the signature image. The signature data, which are captured using this device, comprises at least the coordinates and the signature made on the signature capturing window in a predetermined resolution in a preset coordinate system. In the alternative, it can concern a signature capture apparatus, which captures other biometric data, e.g., using a fingerprint scanner or a camera, and which transmits these data in a safeguarded manner, e.g. encrypted, to the data processing device.

The data processing device, such as, e.g., a computer, to which the signature apparatus of the inventive signature system is connected, comprises at least the following-mentioned devices. A storage device is provided, in which the document and the signature data are to be stored. Further, a first check sum generating device is provided, with which a first check sum for the document and the optionally-added biometric data is to be generated using a predetermined first hash function. In addition, a second check sum generating device is provided, with which a second check sum for the document and the signature image inserted into the document is to be generated using a second hash function. A random value is generated using a real random number generator, which is integrated in the data processing device.

In addition, the data processing device of the inventive signature system comprises a symmetric encryption device and an asymmetric encryption device. This symmetric encryption device is constructed for the purpose of performing a symmetric encryption of the first check sum and the optionally-provided biometric data, wherein the key for the symmetric encryption is the sum of the second check sum and the random value generated by the random number generator. The asymmetric encryption device is constructed for the purpose of asymmetrically encrypting a first created overall check sum with a second private key of a second key pair. Thus, the overall check sum is the check sum for the document with the signature image inserted therein and the invisibly-added attachments using a predetermined third hash function. It is noted that this second private key is a part of key part that also comprises an associated second public key.

Finally, the output interface of the data processing device of the inventive signature system is constructed such that the document with the inserted, visible signature image and the invisible attachments is provided at this output interface. Thus, such documents can then also be sent as is via, e.g., an external network, such as the Internet.

A further exemplary embodiment of an inventive signature system comprises a signature data capturing device that also captures additional or other biometric data in addition to or instead of the coordinate(s) of the signature made on the signature capturing window. These additional and/or other biometric data can include, e.g., the previously-mentioned features. In particular, such a signature data capturing device thus comprises at least one of the following devices: pressure detecting device, time period detecting device, fingerprint capturing device, handprint capturing device, face capturing device, voice sample capturing device, or iris- and/or retina capturing device, or may comprise any combination of a plurality of these devices. The above-mentioned capturing/detecting devices have already been described in detail in regard to their construction and mode of operation with reference to the inventive methods. The above-mentioned iris- and/or retina capturing device is constructed for this purpose to detect at least certain areas of the iris and/or retina of a particular eye of the signer, who has made the signature, in a predetermined resolution in a preset coordinate system.

A further exemplary embodiment of the present invention envisions that the above-mentioned additional devices for capturing/detecting additional biometric data are protected against manipulation from the outside at least with an encrypted transmission and a traceable hardware ID. It is thereby prevented that foreign bodily features, which are not to be attributed to the signer, can be correlated to the signature made by the signer. In particular, it is emphasized that such additional devices for capturing additional biometric data are preferably housed, e.g., in a housing that also comprises the signature apparatus, such as, e.g., a signature pad.

Finally, a further aspect of the present invention comprises a computer-readable medium having instructions thereon, which are performable by a computer and cause the computer system to perform a method for safeguarding a document with inserted signature image, as was described above. A further aspect of the present invention concerns a computer-readable medium having instructions thereon, which are performable by a computer and cause the computer system to perform the method for in-house inspection of a document, which has been encrypted according to one of the above-described inventive methods. Furthermore, the present invention according to a further aspect concerns a computer-readable medium having instructions thereon, which are performable by a computer and cause the computer system to perform the method for examining the authenticity of a signed document, as was described above. Such a computer-readable medium is well known and need not be further described herein. In particular, diskettes, hard drives, CD-ROMs, etc. are to be subsumed herein. In addition, the invention concerns various computer programs, which comprise instructions performable by a computer that cause the computer to perform the above-described different methods.

BRIEF DESCRIPTION OF THE DRAWINGS

In the following, a plurality of embodiments of the present invention are described in detail with reference to the attached drawings for further explanation and better description.

DETAILED EXPLANATION OF THE EXEMPLARY EMBODIMENTS OF THE PRESENT INVENTION

Figure 1:
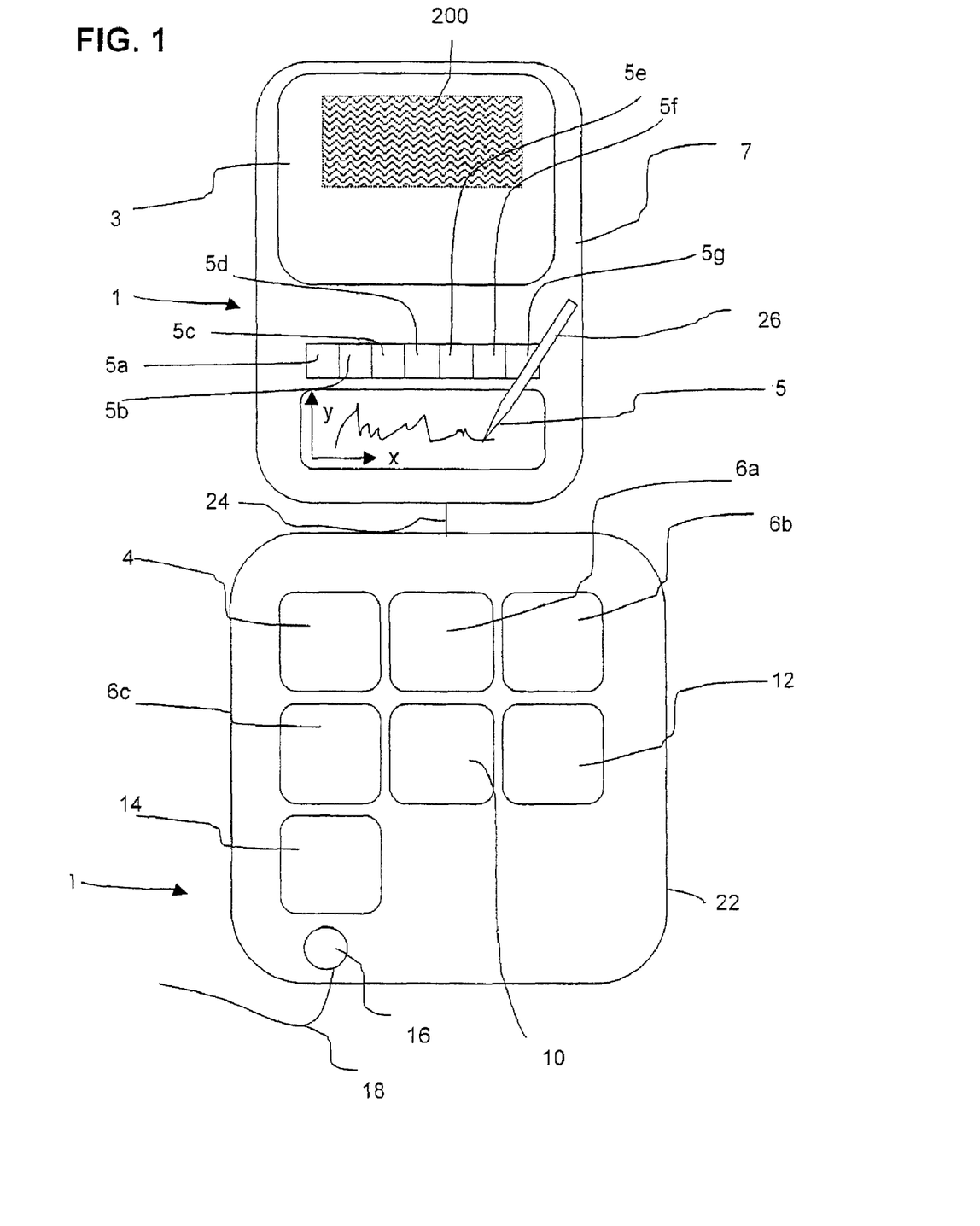
FIG. 1 shows a schematic view of an inventive signature system according to a first embodiment of the present invention comprising a signature pad and a data processing device.

In FIG. 1, a first exemplary embodiment of an inventive signature system is shown in a largely schematic representation. This signature system comprises a so-called signature pad 1, which comprises a display 3 showing a to-be-signed document 200 adjacent to a signature capture window 5 in an individual housing 7 in the embodiment shown herein; in practice, the display 3 lies above the transparent signature capture window 5, so that one can follow the movement of the writing implement on the display 3 while signing. For the sake of good order, it is noted that the inventive signature system can also comprise a signature apparatus 1, in which the display 3 is omitted. In the embodiment shown herein, the signature capture window 5 is constructed so that a signature 203 can be made on it with a writing implement 26 in the usual way like on a sheet of paper. In this embodiment, the pressure applied to the signature capture window 5 when making the signature 203 using the writing implement 26 and the time period are detected in addition to the signature image 203. The detection devices 5a (for the pressure detection) and 5b (for the detection of the time period), which are necessary therefor, are contained in the housing 7 of the signature apparatus 1 and are well-known, so that they need not be discussed in detail.

In the embodiment of the invention shown herein, additional detection devices are also shown largely schematically, with which the following bodily features of the signer can be detected:
- fingerprint capture device 5c, with which the fingerprint of at least one finger of a predetermined hand of the signer, who has made the signature 203, is captured in a predetermined resolution in a preset coordinate system (x, y),
- handprint capture device 5d, with which the handprint of a predetermined hand of the signer, who has made the signature 203, is captured in a predetermined resolution in a preset coordinate system x, y,
- face capture device 5e, with which at least certain facial features of the signer, who has made the signature 203, are captured in a predetermined resolution in a preset coordinate system x, y,
- voice sample capture device 5f, with which a voice sample of signer, who has made the signature 203, is captured in a predetermined resolution, and
- iris- and/or retina capture device 5g, with which at least certain areas of the iris and/or the retina of a predetermined eye of the signer, who has made the signature 203, are captured in a predetermined resolution in a preset coordinate system (x, y).

In addition to the above-noted detection devices and the data relating to persons obtained thereby, an identity number individualizing the device can also be consigned in the device, which identity number is transmitted together with the captured data.

For the sake of good order, it is noted that an inventive signature capture apparatus must only be configured, if desired, to detect one of the mentioned features or combinations of some lesser number of biometric features. In this respect, a fingerprint scanner is also to be regarded as an inventive signature apparatus, which fingerprint scanner captures the biometric data of a fingerprint in sufficient quality, safeguards (i.e. transmits in an encrypted manner) it and also sends an ID with it, which later permits conclusions to be drawn about the signature apparatus (i.e., e.g., the fingerprint scanner).

In the embodiment of an inventive signature system depicted in FIG. 1, the signature apparatus 1 is connected with a data processing device 2 via a connector 24. The above-mentioned biometric data captured when executing the signature 203 using the writing implement 26 are transmitted to the data processing device 2 via the connection 24 for further processing and handling. Incidentally, it is noted that data can be transmitted via the connector 24, e.g., also from the data processing device 2, such as for example the document 200 to be shown in the display 3. The communication of the signature apparatus with the data processing device takes place in a secure manner (i.e. encrypted).

The data processing device 2 comprises a housing 22, in which various devices 4, 6a, 6b, 8, 10, 12 and 14 are housed. Thus, a storage device 4 is provided, in which the document 200 and the associated signature data are stored. The signature data herein comprise at least the data of the signature image 203 in a predetermined resolution with reference to a predetermined coordinate system x, y, as is indicated in FIG. 1 for the case of the biometric capture of the handwritten signature in the signature capture window 5.

Further, a first check sum generating device 6a is provided, which is constructed such that a first check sum for the document 200 and attachments, which will be explained below, is generated using a predetermined first hash function. A second check sum generating device 6b is constructed such that a second check sum for the document 200 and attachments, which will be explained below, is generated using a predetermined second hash function. A third check sum generating device 6c is constructed such that a third check sum for the document 200 and the signature image 203 inserted into the document 2003, as well as optionally-provided additional attachments, is generated using a third hash function.

A further component of the data processing device 2 is a real random number generator 10, with which random values are generated. This random number generator 10 supplies a random value 206 to a symmetric encryption device 12 that is also a part of the data processing device 2. This symmetric encryption device 12 is constructed for the purpose of symmetrically encrypting the biometric signature data 201 and the first check sum 202. The key used herein is thus formed by the sum of the second check sum 204 and the generated random value 206.

Finally, an asymmetric encryption device 14 is provided, which is constructed for the purpose of asymmetrically encrypting an overall check sum 210 with a second private key 211 of a second key pair 211, 212. This second key pair is comprised of the second private key 211 and an associated second public key 212.

A further component of the data processing device 2 is an output interface 16, to which the document 200 having an inserted, visible signature image 203 and invisible attachments 201', 202', 206' and 210', which will be explained below, is provided. Thus, the document 200 having the inserted, visible signature image 203 and the invisible attachments 201', 202', 206' and 210', which are attached to the document 200, can then be sent to an addressee, such as a company, via the connector 18 of the output interface 16 and e.g., via a world-wide network, such as the Internet.

Figure 2:
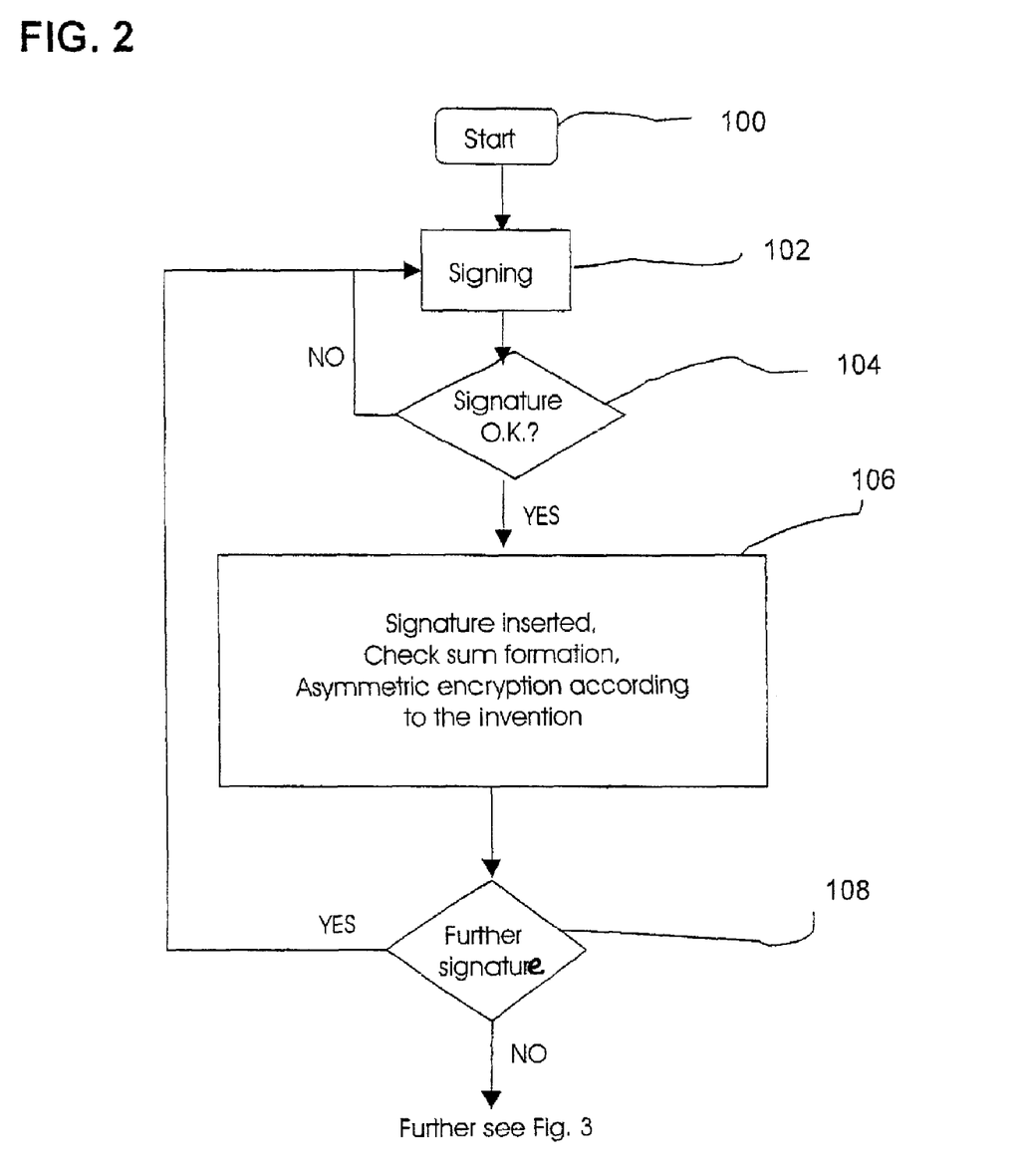
FIG. 2 shows a schematic flow diagram, in which a first part of a flow diagram of the method according to a first embodiment of the invention is illustrated.
Figure 3:
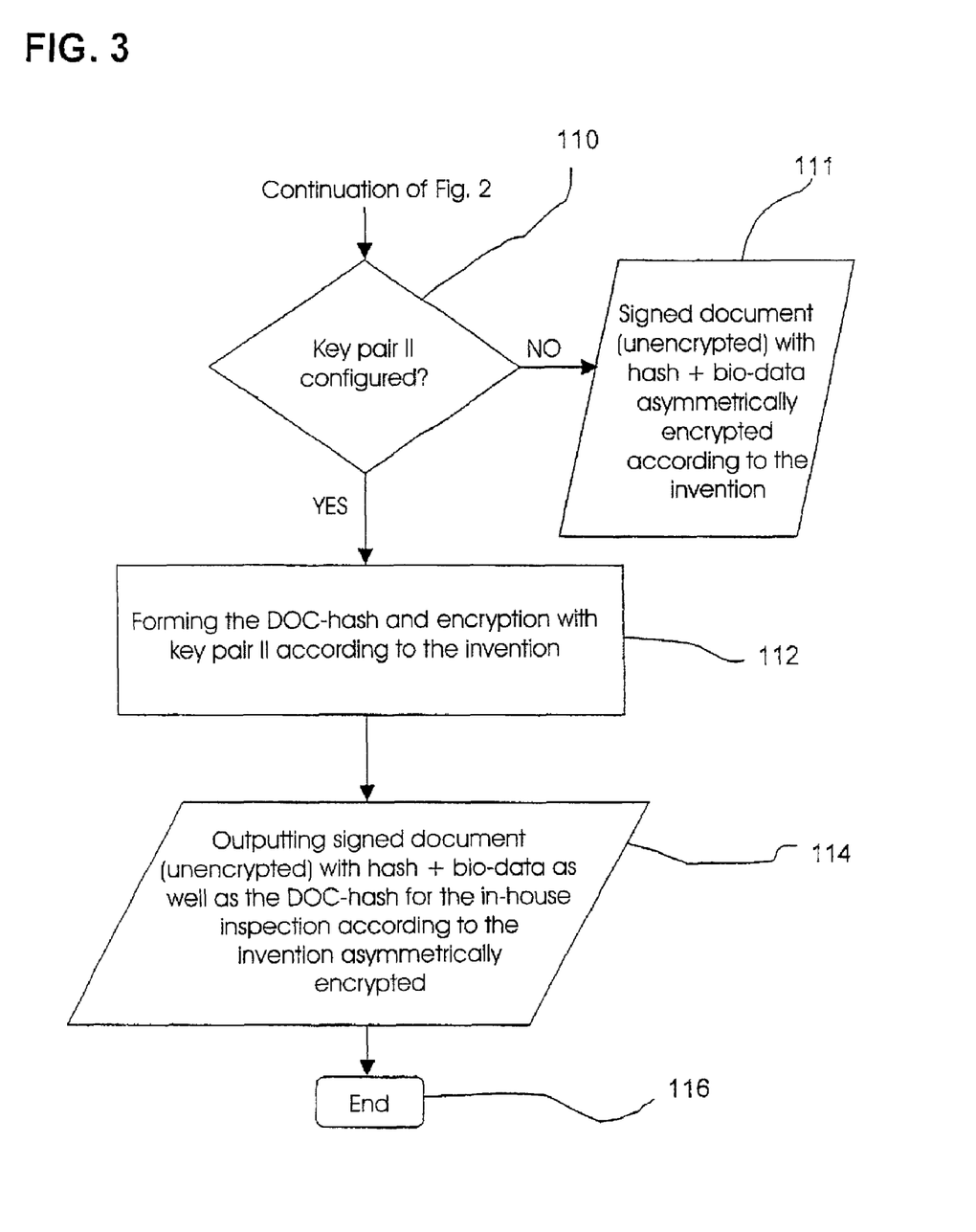
FIG. 3 shows a schematic flow diagram, in which a second part of the flow diagram shown in FIG. 2 of the method according to the first embodiment of the invention is illustrated.

In FIGS. 2 and 3, the basic inventive process flow of a first embodiment of the inventive method is shown for safeguarding a document 200 with an inserted signature image 203. Thus, for example, the method is started with step 100 by turning-on the signature apparatus 1. The signature apparatus 1 is thereby ready to capture the signature and/or biometric data of a signer using the writing implement 26 on the signature capture window 5. At the same time, in accordance with the first step of the inventive method, the document 200 can be provided as a data set in a particular data format (for example, as a PDF data set, Word data set, TIFF data set, JPG data set, wave, mp3, divx, avi, etc.) and can be displayed in the display 3 of the signature apparatus 1. As soon as the signature has been made in the signature capture window 5 of the signature apparatus 1 using the writing implement 26, the captured biometric data are provided as a digital signature image 203. This signature step 102 is also shown in FIG. 2.

Figure 4:
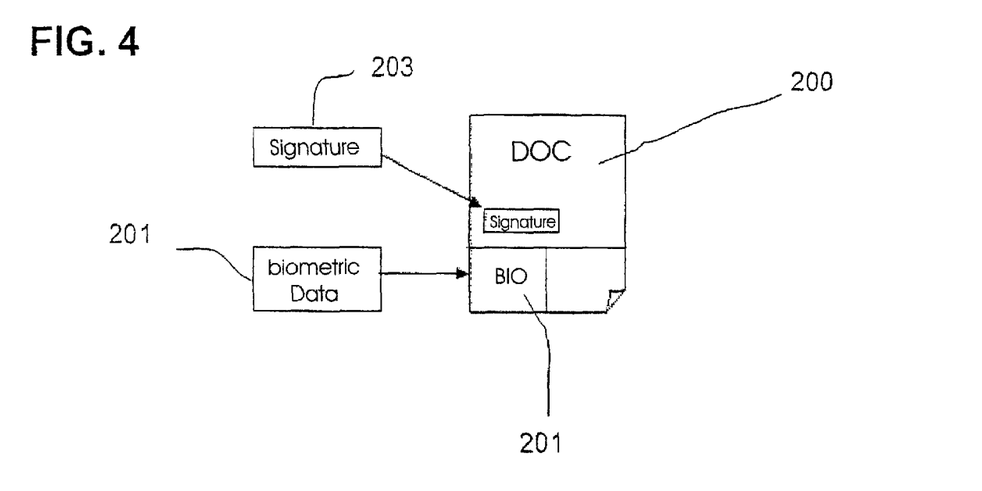
FIG. 4 shows a schematic illustration of a document, as is used in the inventive method of the present invention that is shown in FIGS. 1-3.

As was already mentioned, additional biometric data 201 can also be captured, depending upon how the signature apparatus 1 is equipped, in addition to the actual signature image 203 with the associated biometric data in a particular resolution and in a particular coordinate system, so that later a plurality of identification features of the signer or also different identification features of different signers can be inserted into the document. These are, e.g., the pressure procession and the time period. As is indicated in FIG. 4a, these biometric data 204 are treated as separate data units (data streams).

If the signature process 102 is correctly executed, the query 104 is thus answered with 'yes', so that the signature image 203 is visibly inserted into the document 200 in the next method step 106. If provided, the biometric data are invisibly attached to the document 200 as data block 201. In this method step 106, different check sums are also generated and different encryptions are performed. These method steps will be described in more detail below with reference to FIG. 5.

If the method step 106 is completed, it is asked in step 108 whether the document 200 is still to be signed by other people, i.e. whether additional signature images 203 and the associated biometric signature data 201 are to be integrated therewith. If this is the case, the process returns to method step 102 and the above-described procedure is carried out for the second to the $n^{th}$ signature. If no further signatures are to be integrated, then the process proceeds to step 110 shown in FIG. 3. Here it is asked whether an additional key pair II is configured. If this is not the case, then the signed document 200 with the signature image 203 inserted therein and the optionally-provided biometric signature data 201, which were attached as data block 201', as well as additional attachments that will be described below, is output in step 111.

If a key pair II is configured, then it is continued to method step 112. This method step 112 will be described in more detail below with reference to FIG. 6. After ending the method step 112, a signed document 200 with the inserted signature image 203 having specially-encrypted attachments is provided and/or is output in step 114. In step 116, the inventive method is ended.

In FIG. 4, the basic structure of a signed document 200 is shown. The signature image 203 is inserted in the document 200 in accordance with step 106. The document 200 can be readably and/or audibly represented and/or can be printed on a not-shown display or other output medium using a data processing program corresponding to the particular type of data (such as, e.g., Microsoft Word). Optionally-provided biometric signature data 201 are attached to the document 200 as an invisible data unit 201.

The method step 106 according to FIG. 2 of the inventive method will now be described with reference to FIGS. 5a and 5b. Thus, in this method step 106, a first check sum 202 for the document 200 with the inserted signature image 203 and, if provided, inclusive of the attached biometric data 201, is generated using a first hash function. This first check sum 202 is denoted in FIG. 5a as "Hash 1". As is symbolically represented in FIG. 5a, this first check sum 202 is invisibly attached to the document 200.

As shown in FIG. 5b, which is a continuation of the method step 106 shown in FIG. 5a, a second check sum 204 for the document 200 with the inserted signature image 203 (but not for the invisible attachments 201, 202) is now generated using a predetermined second hash function. This second hash function preferably is identical with the first hash function, but it can be selected from various hash functions implemented in the apparatus according to the circumstances of the user of the inventive signature system. The second check sum 204 is denoted in FIG. 5b as "Hash 2".

A random value 206 is then generated using the real random number generator 10 of the data processing device 2 and then a symmetric encryption of the first check sum 202 and, if provided, the biometric data 201, together with the check sum 202 is performed in step 116. The key for this symmetric encryption 213 is the sum of the second check sum 204 and the just-generated random value 206. The symmetrically-encrypted attachment 202' (symmetrically-encrypted first check sum 202 and/or symmetrically-encrypted first check sum 202 and biometric data) is then invisibly attached to the document 200 with the inserted signature image 203. In other words, the first check sum 202 and, if provided, the biometric signature data 201, are encrypted together symmetrically in a data stream by performing a symmetric encryption using a key generated from the second check sum 204 and a random value 206. In the present case, a 448 Bit Blowfish-encryption has been selected. However, other types of symmetric encryption can also be utilized.

For the sake of good order, it is also noted that there is only one symmetrically-encrypted data block that contains either only the check sum or the check sum and the biometric data. If the biometric data has been put in an extra encrypted block, then these, i.e. without the encrypted check sum, would be individually removable from the data set. The fusion of the invisible attachments 201 and 202 by the encryption is graphically represented by the uniform coloring after the encryption and the frame with only one arrow, which ends in the symmetric encryption 213.

The above random value 206, with which the symmetric encryption 213 was performed (as a part of the encryption password), is also asymmetrically encrypted in method step 214 of FIG. 5. The key for this asymmetric encryption 214 is a first public key 208 of a first key pair (208, 209), which is comprised of a first private key 209 (see FIG. 8) and the associated first public key 208. The first private key 209 can, for example, be consigned to a notary. The outside contractor and company using the inventive signature system should, as much as possible, have no access to this private key 209 of the first key pair 208, 209, in order to ensure that neither the outside contractor nor the company can themselves alter the document 200 with the inserted signature image 203 and the invisible attachments 201', 202', 206'. The public key 208 of this first key pair 208, 209 is consigned in the signature system 1, 2 in a simple way. For example, it can be stored in the storage device 4 of the data processing device 2.

As shown in FIG. 5b, the asymmetric encryption 214 relates to a PKI-encryption. Other asymmetric encryptions could also be utilized. As indicated in FIG. 5b, the asymmetrically-encrypted random value 206 is also invisibly attached to the document 200 as attachment 206'. Thus, a document 200 provided with the signature image 203 is now available. The first check sum 202 and, if provided, the biometric signature data 201, which were symmetrically encrypted by performing a symmetric encryption using the special key generated from the second check sum 204 and a random value 206, are attached to the document 200 as invisible attachments 201/202'. Moreover, the asymmetrically-encrypted random value 206, which is a part of the key for the encryption of the second check sum 202 and the biometric signature data 201, is invisibly attached to the document 200 as attachment 206'.

The fundamental principle of an inventive method for safeguarding a document 200 with inserted signature image 203 in a computer system 1, 2 is thereby concluded. The document 200 protected and safeguarded thereby with the inserted signature image 203 and the additional encrypted attachments 201/202', 206' can now be output via the interface 16 of the data processing unit 2. A practical usage situation of the inventive method can, e.g., be comprised in that an outside contractor has an insurance contract signed by the to-be-insured person using the signature apparatus 1. The electronically-captured signature 203 and the optionally-provided additional biometric signature data 201 are then transmitted via the connector 24, e.g., to the notebook 2 of the insurance agent and encrypted there according to the previously-explained inventive procedure and thereby protects it from unauthorized access. This type of protected document 200 with the attachments 201/202', 206' and the inserted signature 203 is then transmitted via the interface 16 and the connector 18 and a not-shown communication path, such as e.g., the Internet, to the, e.g., insurance company. The inventively-safeguarded document 200 and the attachments 201/202' and 206' protected from alterations can be archived there. The first private key 209 belonging to the first public key 208 of the first key pair 208, 209, with which a decoding of the attachment 206' and thereby, if applicable, the attachments 201/202 would be possible, is normally not available to the business company, but rather is consigned to a notary. The same also applies, of course, for the employee, who took part at the signature capture. Thus, in case of a dispute, it can not be imputed that the business company or the participating employee manipulated the disputed document 200 and/or the invisible attachments 201/202.

It is thus a problem that, in this case, the company or generally the user of the inventive signature system has no possibility for self-checking the data integrity of the document 200 with the inserted signature 203. Thus, in a further exemplary embodiment, the method step 112 according to FIG. 3 is performed as is shown in FIG. 6. The query 110 was first executed whether a second key pair II is configured on the data processing device 2. If this question is answered with yes, then the method step 112 is performed. If the query 110 is answered negatively, then the previously-explained signed document 200, which is decoded, with the attachments 201', 202' and 206', which are encrypted, is output in step 111.

In method step 112, a first overall check sum 210 for the document 200 with the signature 203 inserted therein and the invisibly-added attachments 201/202', 206' is generated using a predetermined third hash function 206. It is noted that this third hash function is basically identical with the first and second hash functions. However, it can also be, e.g., freely selected by the user of the signature system according to the circumstances, e.g., the other hash functions, depending upon which hash function is provided in the system 2. In the exemplary embodiment shown in FIG. 6, the overall check sum 210 is denoted as "Doc-Hash". Step 112*a* is then carried out, which comprises an asymmetric encryption of the overall check sum 210 with a second private- or public key 211/212 (depending upon additional identification demands, e.g., at the utilized electronic data processing unit or of the holder of the second key pair, e.g., the outside contractor) of a second key pair 211, 212. The second key pair is comprised of the second private key 211 and an associated second public key 212. In the present case, this asymmetric encryption 112*a* is again performed with a PKI-encryption. Of course, it is also possible to utilize other asymmetric encryptions.

The overall check sum 210 asymmetrically encrypted as such is also invisibly attached to the document 200 as attachment 210' in addition to the attachments 201/202' and 206'. Thus, the signed document 200 with the inserted signature 203 and the encrypted attachments 201/202', 206', 210' can then be output in step 114 according to FIG. 3.

Figure 7:
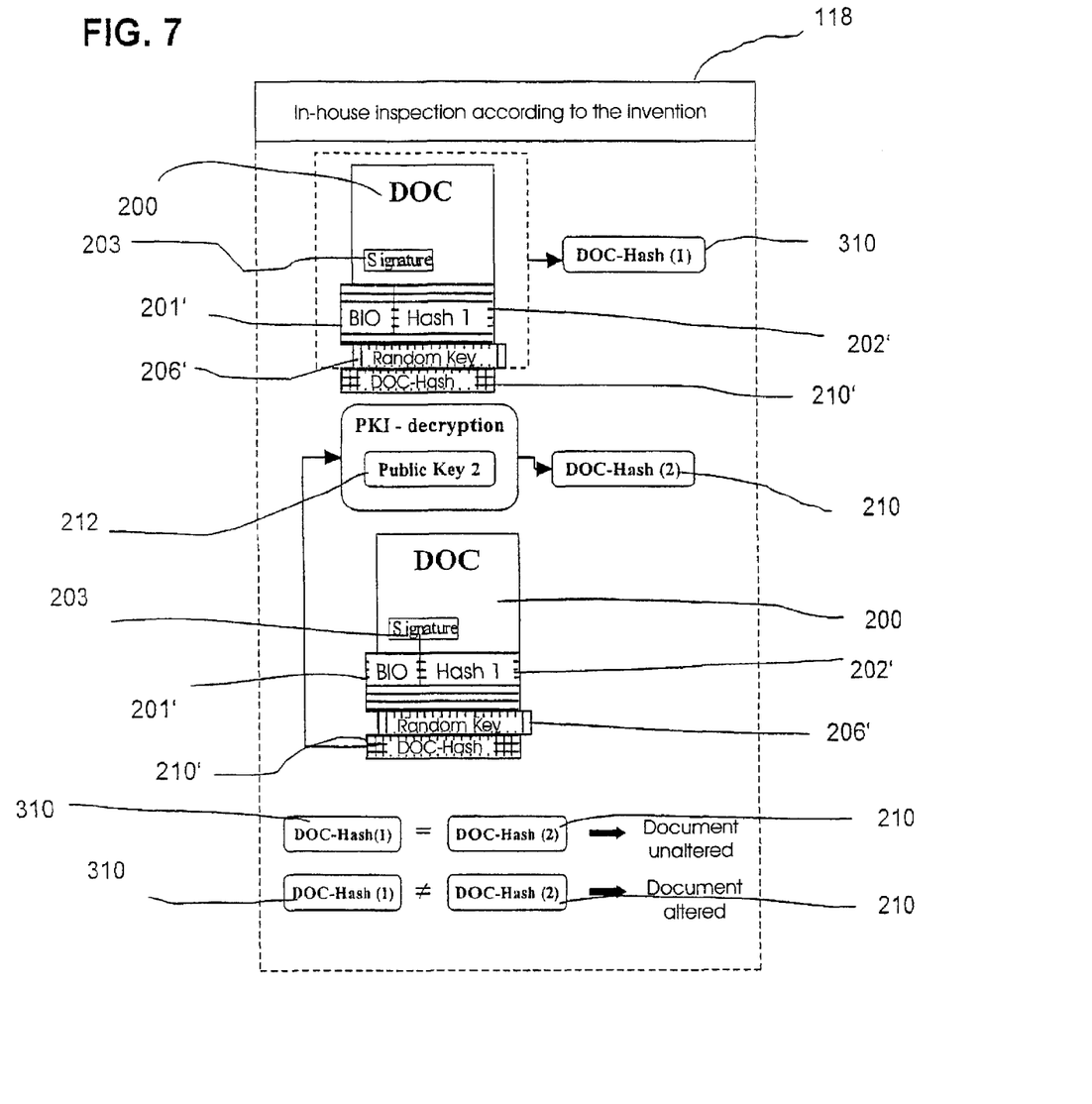
FIG. 7 shows a schematic illustration of the inventive method for in-house inspection of a document that was encrypted according to one of the inventive methods.

According to the inventive method for in-house inspection of a document 200 described in the following, which document 200 was further encrypted according to the method described with reference to FIG. 6, it is now also possible to examine whether the document 200 has been manipulated after the time point of the archiving. The procedure for in-house inspection shown in FIG. 7 is thus performed after receipt of the document 200, which was processed according the above method, and the encrypted attachments 201/202', 206' and 210'. Herein, an overall check sum 310 for the entire document 200 with the signature image 203 inserted therein and the added attachments 201/202' and 206' is performed for the document 200, which was output in step 114 according to FIG. 3 and FIG. 6, using the above-mentioned second hash function. If no biometric data 201 is present, only the check sum for the document 200 with inserted signature image 203, the encrypted first check sum 202' and the encrypted random value 206' is generated.

Moreover, an asymmetric decoding of the first check sum 210' added to the document 200 takes place using the second public- or private key (depending upon additional identification demands, e.g., at the utilized electronic data processing unit or of the holder of the second key pair, e.g., the outside contractor and the private or public key of the second key pair selected thereby during the encryption) of the second key pair 211, 212. The two check sums 210, 310 are then compared with each other. In case the two values are identical, it can be assumed with high probability that no alteration took place. On the one hand, an alteration can mean a manipulation of the document 200 with the inserted signature image 203 and/or the additional attachments 201, 202 and 206, as well as also a transmission error during transmission of the document 200 with attachments 201', 202', 206' from the outside contractor to the company. This examination, as was described herein, thus makes it possible for the company to examine the document 200 for intactness, without having to access the encrypted biometric data 201 and, if desired, permits conclusions to be drawn about the person or the apparatus, to which the key pair can be allocated, concerning the ID of this second key pair utilized in the encryption.

Figure 8:
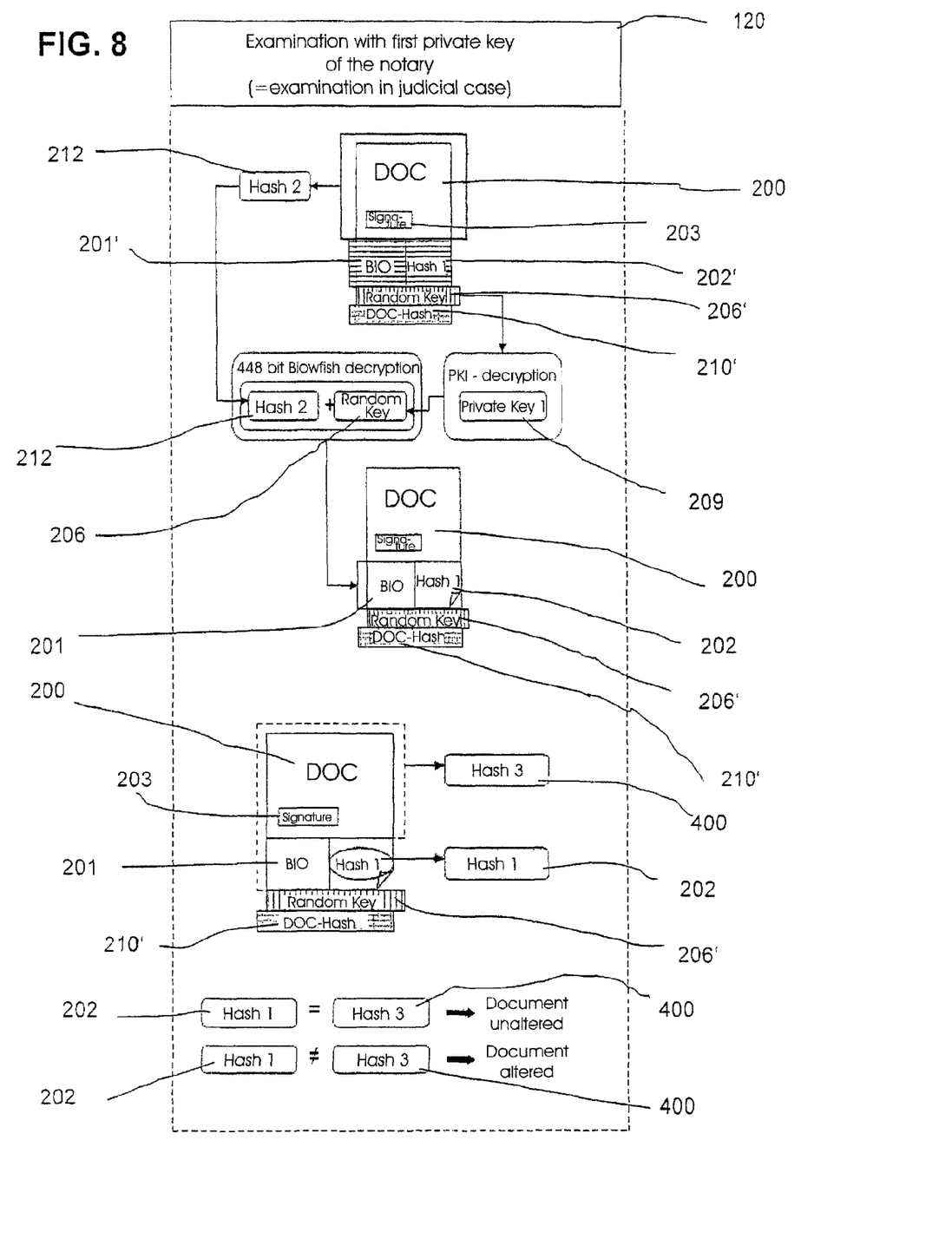
FIG. 8 shows a schematic illustration of a further embodiment of the inventive method for examining, e.g., in a judicial proceeding, a document safeguarded according to the invention.

The method for examining the document 200, e.g., at court with the assistance of the notary, i.e. the person, with whom the first private key 209 of the first key pair 208, 209 was consigned, will now be explained with the aid of FIG. 8. A check sum of the document 200 with the signature image 203 inserted therein is generated using the second hash function. Moreover, the encrypted random value 206' added to the document 200 is decoded using the first private key 209 of the first key pair 208, 209. Consequently, the sum of the check sum 212 formed hereby, which is denoted as Hash 2, and the decoded random value 206 is formed. This summation value is then used for the symmetric decoding of the biometric data 201 and the first check sum 202', contained in this encrypted data block, which are attached to the document 200. Thus, access can now be made to the encrypted biometric data 201. Further, the third check sum 400 for the document 200 with the signature image 203 inserted therein and the encrypted biometric data 201 can then be formed with the first hash function.

Then, the verification follows whether the encrypted first check sum 202 is identical with the formed check sum 400. If this is the case, it can be assumed with confidence that the document and the contained biometric data are unaltered and have not been subjected to inadvertent alteration or manipulation. If the first check sum 202 and the generated check sum 400 differ, then it must be assumed that an inadvertent alternation or a manipulation took place. This information is then output.

I claim:

1. A method comprising:
   (i) inserting at least one digital signature image into an electronic document,
   (ii) generating a first check sum for the electronic document having the inserted digital signature image using a first hash function,
   (iii) generating a second check sum for the electronic document having the inserted digital signature image using a second hash function,
   (iv) generating a random value,
   (v) symmetrically-encrypting the first check sum using a key, wherein the key for the symmetric encryption is the sum of the second check sum and the generated random value,
   (vi) attaching the symmetrically-encrypted first check sum to the electronic document,
   (vii) asymmetrically-encrypting the generated random value with a first public key of a first key pair comprising a first private key and the first public key, and
   (viii) adding the asymmetrically-encrypted random value to the electronic document.

2. The method according to claim 1, wherein step (i) further comprises inserting biometric data into the electronic document, wherein the first and second check sums are then generated for the electronic document having the inserted digital signature image and the inserted biometric data.

3. The method according to claim 2, wherein the biometric data is biometric signature data.

4. The method according to claim 1, further comprising:
   repeating the method to insert a plurality of digital signature images.

5. The method according to claim 2, further comprising:
   (ix) generating a first overall check sum for the entire electronic document having the inserted digital signature image and the inserted biometric data using a third hash function,
   (x) asymmetrically-encrypting the first overall check sum using one of a second private and a second public key of a second key pair,
   (xi) adding the asymmetrically-encrypted first overall check sum to the electronic document, and
   (xii) outputting the electronic document in a manner such that the inserted signature image is visible and the asymmetrically-encrypted first overall check sum is invisible.

6. The method according to claim 5, wherein the first, second and third hash functions are identical.

7. The method according to claim 5, further comprising:
   (xiii) generating a second overall check sum for the entire document having the inserted digital signature image and the asymmetrically-encrypted first overall check sum, but without the attached, encrypted first overall check sum being included in the electronic document, using the second hash function,
   (xiv) decoding the first overall check sum using one of the second public key and the second private key,
   (xv) comparing the second overall check sum with the decoded first overall check sum, and
   (xvi) determining whether the electronic document has been altered based upon the comparison.

8. The method according to claim 1, further comprising:
   generating a fourth check sum for the electronic document, without including any invisible encrypted attachments in the fourth check sum, using the second hash function,
   decoding the asymmetrically-encrypted random value using the first private key,
   summing the fourth check sum and the decoded random value,
   decoding the symmetrically-encrypted first check sum using the summation of the fourth check sum and the decoded random value,
   comparing the decoded first check sum with the fourth check sum, and
   determining whether the electronic document has been altered based upon the comparison.

9. The method according to claim 2, further comprising:
   generating a fourth check sum for the electronic document, without including any invisible encrypted attachments in the fourth check sum, using the second hash function,
   decoding the asymmetrically-encrypted random value using the first private key,
   summing the fourth check sum and the decoded random value,
   decoding the symmetrically-encrypted biometric data using the summation of the fourth check sum and the decoded random value, and
   outputting the decoded biometric data.

10. A signature system for signing a document, comprising:
    a) a signature apparatus having:
       a signature capture window configured to capture a signature made thereon using a writing implement, and
       a signature data capture device configured to provide at least the coordinates of the signature made on the signature capture window in a predetermined resolution and in a preset coordinate system,
    b) a data processing device electrically connected with the signature apparatus and having:
       a storage device configured to store at least the document and the captured signature data,
       a first check sum generating device configured to generate a first check sum for the document with a captured signature image inserted therein using a first hash function,
       a second check sum generating device configured to generate a second check sum for the electronic document with the captured signature image inserted therein using a second hash function,
       a random number generator configured to generate random values,
       a symmetric encryption device configured to symmetrically encrypt the first check sum using a key that is the sum of the second check sum and a random value generated by the random number generator, and
       an asymmetric encryption device configured to asymmetrically encrypt the random value using a first private key of a first key pair comprising the first private key and a first public key, and
    c) an output interface electrically connected with the data processing device and configured to output the electronic document with the inserted, visible signature image and invisible, encrypted attachments generated by the symmetric encryption device and the asymmetric encryption device.

11. The signature system according to claim 10, further comprising a third check sum generating device configured to generate a first overall check sum for the electronic document with the inserted signature image and the encrypted attachments using a third hash function.

12. The signature system according to claim 10, comprising a further biometric data capturing device.

13. The signature system according to claim 12, wherein the further biometric data capturing device is selected from the group consisting of:
- a pressure detection device configured to capture a pressure procession of the signature made by the signer in a predetermined resolution and in a preset pressure range,
- a time period detection device configured to record the time period of the signature made by the signer in a predetermined resolution and in a preset time range and with reference to a preset coordinate system,
- a fingerprint capture device configured to capture a fingerprint of at least one finger of a predetermined hand of the signer in a predetermined resolution and in the preset coordinate system,
- a handprint capturing device configured to capture a handprint of a predetermined hand of the signer in a predetermined resolution and in the preset coordinate system,
- a facial feature capture device configured to capture at least certain facial features of the signer in a predetermined resolution and in the preset coordinate system,
- a voice sample capture device configured to capture a voice sample of the signer in a predetermined resolution, and
- an eye feature capture device configured to capture at least certain areas of at least one of the iris and the retina of a predetermined eye of the signer in a predetermined resolution and in the preset coordinate system.

14. The signature system according to claim 10, further comprising at least two biometric data capturing devices selected from the group consisting of:
- a pressure detection device configured to capture a pressure procession of the signature made by the signer in a predetermined resolution and in a preset pressure range,
- a time period detection device configured to record the time period of the signature made by the signer in a predetermined resolution and in a preset time range and with reference to a preset coordinate system,
- a fingerprint capture device configured to capture a fingerprint of at least one finger of a predetermined hand of the signer in a predetermined resolution and in the preset coordinate system,
- a handprint capturing device configured to capture a handprint of a predetermined hand of the signer in a predetermined resolution and in the preset coordinate system,
- a facial feature capture device configured to capture at least certain facial features of the signer in a predetermined resolution and in the preset coordinate system,
- a voice sample capture device configured to capture a voice sample of the signer in a predetermined resolution, and
- an eye feature capture device configured to capture at least certain areas of at least one of the iris and the retina of a predetermined eye of the signer in a predetermined resolution and in the preset coordinate system.

15. A non-transitory computer-readeable medium having instructions stored thereon executable by a computer processor for performing a method of:
- (i) inserting at least one digital signature image into an electronic document,
- (ii) generating a first check sum for the electronic document having the inserted digital signature image using a first hash function,
- (iii) generating a second check sum for the electronic document having the inserted digital signature image using a second hash function,
- (iv) generating a random value,
- (v) symmetrically-encrypting the first check sum using a key, wherein the key for the symmetric encryption is the sum of the second check sum and the generated random value,
- (vi) attaching the symmetrically-encrypted first check sum to the electronic document,
- (vii) asymmetrically-encrypting the generated random value with a first public key of a first key pair comprising a first private key and the first public key, and
- (viii) adding the asymmetrically-encrypted random value to the electronic document.

16. The non-transitory computer-readable medium according to claim 15, further comprising instructions to insert captured biometric data into the electronic document, and to generate the first and second check sums for the electronic document having the inserted digital signature image and the inserted captured biometric data.

17. The non-transitory computer-readable medium according to claim 16, further comprising instructions to:
- (ix) generate a first overall check sum for the entire electronic document having the inserted digital signature image and the inserted captured biometric data using a third hash function,
- (x) asymmetrically-encrypt the first overall check sum using one of a second private and a second public key of a second key pair,
- (xi) add the asymmetrically-encrypted first overall check sum to the electronic document, and
- (xii) output the electronic document in a manner such that the inserted signature image is visible and the asymmetrically-encrypted first overall check sum is invisible.

18. The non-transitory computer-readable medium according to claim 17, further comprising instructions to:
- (xiii) generate a second overall check sum for the entire document having the inserted digital signature image and the asymmetrically-encrypted first overall check sum, but without the attached, encrypted first overall check sum being included in the electronic document, using the second hash function,
- (xiv) decode the first overall check sum using one of the second public key and the second private key,
- (xv) comparing the second overall check sum with the decoded first overall check sum, and
- (xvi) determine whether the electronic document has been altered based upon the comparison.

19. The non-transitory computer-readable medium according to claim 15, further comprising instructions to:
- generate a fourth check sum for the electronic document, but without any invisible encrypted attachments being included in the fourth check sum, using the second hash function,
- decode the asymmetrically-encrypted random value using the first private key,
- sum the fourth check sum and the decoded random value,
- decode the symmetrically-encrypted first check sum using the summation of the fourth check sum and the decoded random value,
- compare the decoded first check sum with the fourth check sum, and
- determine whether the electronic document has been altered based upon the comparison.

20. The non-transitory computer-readable medium according to claim 15, further comprising instructions to:
- generate a fourth check sum for the electronic document, but without any invisible encrypted attachments being included in the fourth check sum, using the second hash function,
- decode the asymmetrically-encrypted random value using the first private key,
- sum the fourth check sum and the decoded random value,
- decode the symmetrically-encrypted captured biometric data using the summation of the fourth check sum and the decoded random value, and
- output the decoded captured biometric data.

* * * * *